March 14, 1961 R. C. HERRON 2,974,977
ADJUSTABLE MOUNTING FOR TRACTOR FENDERS
Filed March 27, 1959 2 Sheets-Sheet 1
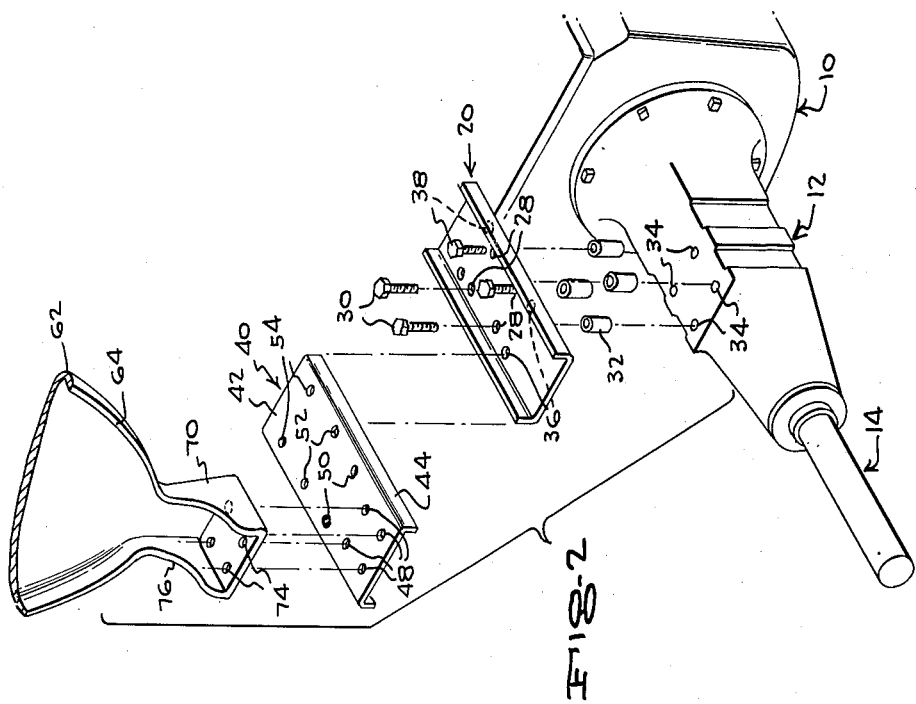
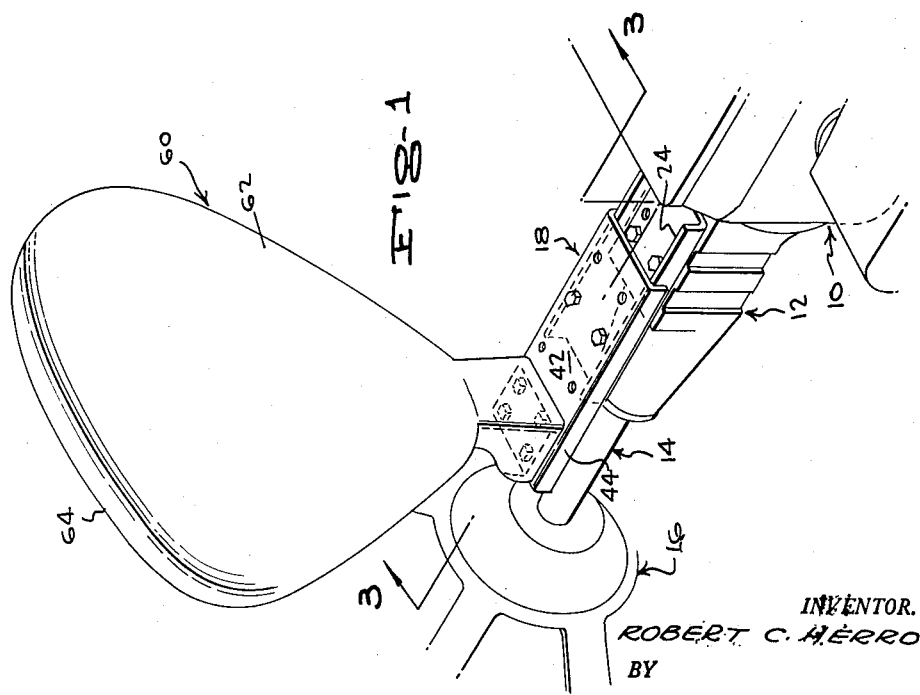
INVENTOR.
ROBERT C. HERRON
BY
McMorrow, Berman & Davidson
ATTORNEYS March 14, 1961 R. C. HERRON 2,974,977
ADJUSTABLE MOUNTING FOR TRACTOR FENDERS
Filed March 27, 1959 2 Sheets-Sheet 2
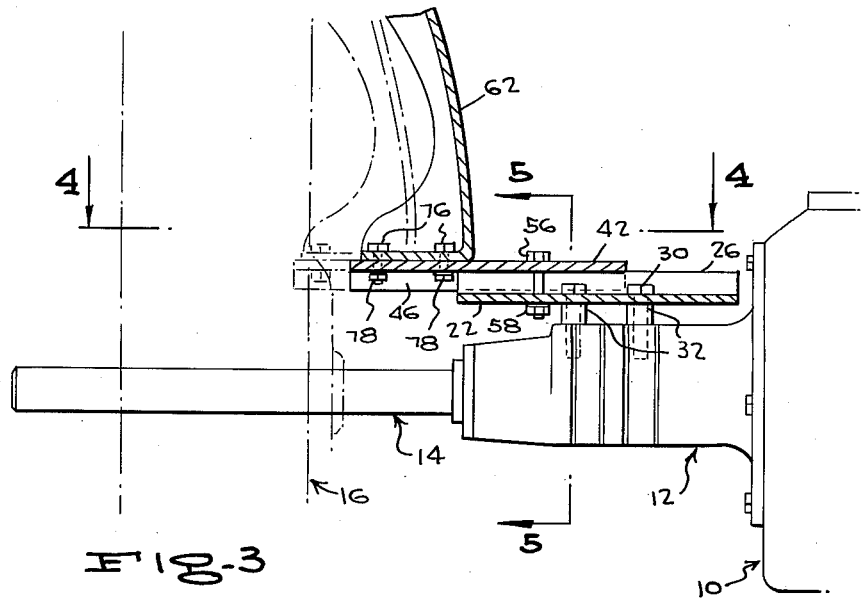
Fig-3
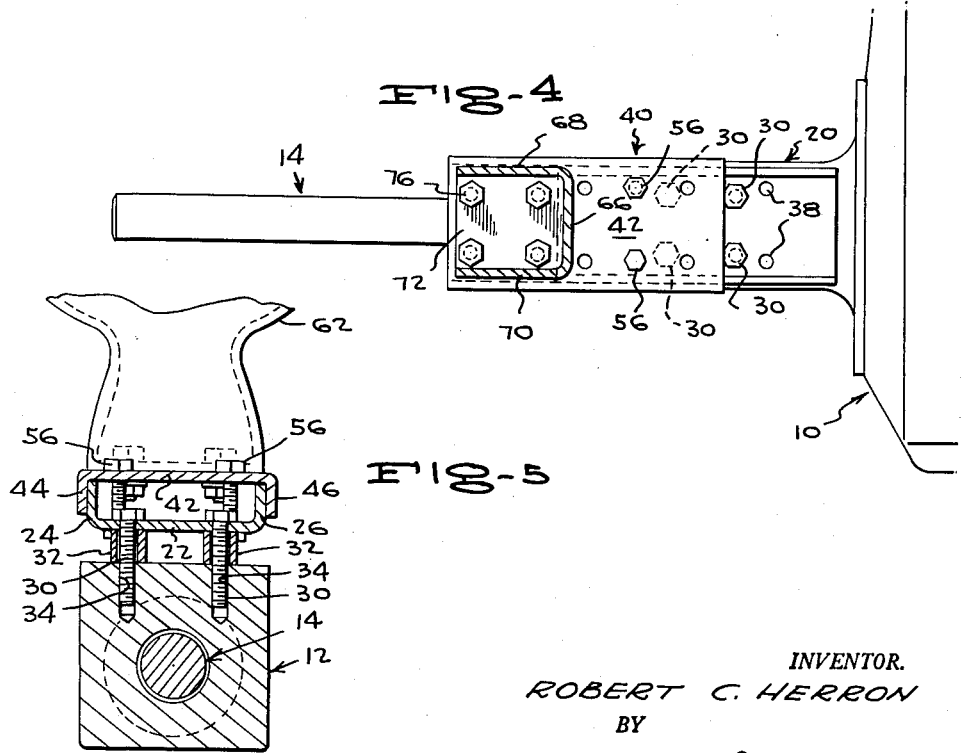
Fig-4
Fig-5
INVENTOR.
ROBERT C. HERRON
BY
McMorrow, Berman & Davidson
ATTORNEYS 0# United States Patent Office 2,974,977
Patented Mar. 14, 1961

2,974,977
ADJUSTABLE MOUNTING FOR TRACTOR FENDERS

Robert C. Herron, 6417 Xerxes Ave. S., Blooming Prairie, Minn.

Filed Mar. 27, 1959, Ser. No. 802,342

1 Claim. (Cl. 280—152)

This invention relates to supporting devices, and more specifically, the present invention pertains to a tractor fender mounting.

From practice it has been established that operators of tractor type vehicles experience considerable difficulty in mounting and demounting tractors since the fenders thereof disposed adjacent the rear axles are normally fixed. Additionally, tractor operators, especially farmers who operate tractors, frequently find it necessary to increase the axial length of the rear axle in order to perform certain farming operations. With the usual fender fixedly secured and immovable relative to the tractor frame, the fender becomes inoperable to serve its intended function, that is, to protect the operator from dirt, dust and other debris which is a consequent attendant result upon the operation of the tractor.

Accordingly, one of the primary objects of this invention is to provide an adjustable fender mount for tractors to facilitate the ease with which the operator may mount or dismount the tractor.

Another object of this invention is to provide an extensible fender mount for the rear wheels of a tractor whereby the fender may be moved to a desired juxtaposition relative to the tractor wheel to prevent dirt, dust and other foreign subject matter from being thrown upon the operator.

This invention contemplates, as a still further object thereof, the provision of a fender mount of the type generally described supra, the mount or mounting being non-complex in construction and assembly, inexpensive to manufacture, and durable in use.

Other and further objects and advantages of the instant invention will become more evident from a consideration of the following specification when read in conjunction with the annexed drawings, in which:

Figure 1 is a perspective view of a rear axle fender mounting shown as installed upon the rear axle of a conventional tractor;

Figure 2 is an exploded perspective view of the fender mounting illustrated in Figure 1;

Figure 3 is an enlarged detail cross-sectional view, partly in elevation, Figure 3 being taken substantially on the vertical plane of line 3—3 of Figure 1, looking in the direction of the arrows;

Figure 4 is a detail cross-sectional view, partly in top plan, Figure 4 being taken substantially on the horizontal plane of line 4—4 of Figure 3, looking in the direction of the arrows; and Figure 5 is an enlarged detail cross-sectional view partly in elevation, Figure 5 being taken substantially on the vertical plane of line 5—5 of Figure 3, looking in the direction of the arrows.

Referring now more specifically to the drawings, reference numeral 10 designates, in general, a rear axle differential housing of a conventional tractor (not shown). To the housing 10 and projecting laterally from each side thereof (only one being shown) is a rear axle housing 12 for a rear axle 14 on which is mounted the conventional rear tractor wheel 16.

The mounting device to which the instant invention is addressed is designated, in general, by reference numeral 18. The mounting device 18 is seen to comprise a substantially U-shaped channel member 20 formed of steel and including a bight portion 22, substantially rectangular in configuration, from the positively extending edges thereof arise a pair of oppositely disposed, integrally formed, laterally spaced and substantially parallel rectangular side walls 24, 26. The bight portion 22 is formed with a plurality of bolt hole openings 28 which extend transversely therethrough to receive bolts 30, the lower ends of the bolts 30 being extended through spacer collars 32 for threaded engagement within bolt hole openings 34 formed in the axle housing 12 in the conventional manner. The bight portion 22 is also provided with a pair of bolt hole openings 36 disposed on one side of the bolt hole openings 28 and a second pair of bolt hole openings 38 are positioned on the other side of the bolt hole openings 28, the function of the pairs of bolt hole openings 36, 38 being set forth more fully below.

The mounting device 18 also includes a second substantially U-shaped channel member 40 formed of steel or of any other suitable material, the U-shaped channel member 40 including a bight portion 42 from the longitudinally extending marginal edges of which depend a pair of laterally spaced substantially rectangular and parallel side walls 44, 46. The bight portion 42, adjacent one end thereof, is formed with a plurality of bolt hole openings 48 and pairs of longitudinally spaced bolt hole openings 50, 52 and 54.

As seen in the drawings, the channel member 40 is inverted over the channel member 20 with the bight portion 42 supported on the upper or outer ends of the side walls 24, 26, and the latter are telescoped within the side walls 44, 46 for adjustable sliding engagement therewith.

The pairs of bolt hole openings 50, 52 and 54 are adapted to selective alignment with the pairs of bolt hole openings 36, 38 whereby the channel member 40 may be extended or retracted relative to the channel member 20. In the illustrated embodiment of this invention the bolt holes 52 are shown as being aligned with the bolt holes 36 and receive therethrough bolts 56 which are releasably secured therein by nuts 58 thereby rigidly connecting the channel members 20, 40 together in this selected adjusted relationship.

Reference numeral 60 denotes a conventional rear wheel fender for a tractor, the fender 60 including a substantially ovate shield portion 62 having a peripheral flange 64. The shield 62 and flange 64 terminate, adjacent their respective lower ends, in a back wall 66, a pair of laterally spaced and confronting side walls 68, 70 and a normally horizontal platform 72. The platform 72 is provided with a plurality of transversely extending bolt holes 74 the spacing of which corresponds to the spacing of the bolt holes 48. The platform 72 seats on the bight portion 40, the bolt holes 48 and 74 are aligned with each other and the platform is rigidly secured thereto by means of bolts 76 which extend through the aforementioned aligned bolt holes by means of nuts 78.

From the foregoing description it now becomes obvious that the shield 60 may be selectively adjusted relative to the wheels 16 by sliding the channel member 40 longitudinally of the channel member 20 to effect selective alignment of the pairs of bolt holes 50, 52 and 54 with, respectively, either of the pairs of bolt hole openings 36 or 38 whereby the shield 60 may be rigidly secured to the channel member 40 by means of the bolts and nuts 56, 58, respectively.

Having described and illustrated one embodiment of this invention, it is to be understood that the same is offered merely by way of example, and that the invention is to be limited only by the scope of the appended claim.

What is claimed is:

A mounting device for the rear fender of a tractor, said mounting device comprising a pair of substantially U-shaped channel members one being inverted and superimposed on the other, said channel members being reciprocable relative to each other in the direction of their respective longitudinal axes, the other of said channel members having a bight portion including a plurality of bolt holes extending transversely therethrough intermediate the remote ends thereof, a plurality of spacer collars aligned with said bolt holes, respectively, a bolt extending transversely through each of said bolt holes and its associated aligned spacer collar, each of said bolts being threadedly received within a rear axle housing of said tractor, the bight portion of said other channel member having a pair of bolt holes extending transversely therethrough on opposite sides, respectively, of said first bolt holes, said one channel member having a bight portion including a plurality of bolt holes extending transversely therethrough adjacent one of its respective ends, a tractor fender having a mounting platform at one of its respective ends, said platform being adapted to engage the bight portion of said one channel member adjacent said one end thereof, said platform having bolt holes extending transversely therethrough corresponding to the spacing between the bolt hole openings formed in said one end of the bight portion of said one channel member, bolts extending through said bolt holes formed in said platform and said bolt holes formed in said one end of the bight portion of said one channel member to fixedly secure said fender to said one channel member, a plurality of pairs of longitudinally spaced bolt holes extending transversely through the bight portion of said one channel member adjacent the other end thereof, said last named pairs of bolt holes being adapted for selective alignment with said first pairs of said bolt holes formed in the bight portion of said other channel member, and bolts extending through selected aligned pairs of said first and last named pairs of bolt holes to secure said one and said other channel members together in adjusted relation relative to each other.

References Cited in the file of this patent

UNITED STATES PATENTS

| | | |
|---|---|---|
| D. 20,327 | Deal | Apr. 13, 1937 |
| 2,774,610 | Ratcliffe | Dec. 18, 1956 |
| 2,886,269 | Carlson | May 12, 1959 |